United States Patent

Takeishi et al.

[15] 3,636,421

[45] Jan. 18, 1972

[54] OXIDE COATED SEMICONDUCTOR DEVICE HAVING [311] PLANAR FACE

[72] Inventors: Yoshiyuki Takeishi, Tokyo; Hisashi Hara; Tai Sato, both of Yokohama-shi; Isao Sasaki, Kawasaki-shi, all of Japan

[73] Assignee: Tokyo-Shibaura Electric Co., Ltd., Kawasaki-shi, Japan

[22] Filed: Dec. 23, 1968

[21] Appl. No.: 786,113

[30] Foreign Application Priority Data

Dec. 28, 1967 Japan ..................42/84999

[52] U.S. Cl. ..................317/235 R, 317/234 UA, 317/235 B, 317/235 AG, 317/235 AS

[51] Int. Cl. ..................H01l 1/10, H01l 3/00, H01l 5/06

[58] Field of Search ..................317/234 UA, 235 B, 235 AL, 317/235 AS

[56] References Cited

UNITED STATES PATENTS

| | | | |
|---|---|---|---|
| 3,325,314 | 6/1967 | Allegretti | 148/175 |
| 3,379,584 | 4/1968 | Bean et al. | 148/175 |
| 3,476,592 | 11/1969 | Berkenblit et al. | 117/201 |
| 3,476,991 | 11/1969 | Mize et al. | 317/235 |
| 3,153,731 | 10/1964 | Shombert | 317/235 AM |
| 3,219,891 | 11/1965 | Benedict | 317/234 |

OTHER PUBLICATIONS

Takeishi et al., " A Low-Energy Electron Diffraction Study of the Epitaxial Silicon Layers on a Ge (111) Surface," Applied Physics Letters Vol. 11, No. 10, pages 330– 332, (Nov. 15, 1967).

Allegretti et al., article in Metatturgy of Elemental and Compound Semiconductors, Vol. 12, Metallurgical Society Conference, Aug. 29– 31, 1960, pages 255– 263.

*Primary Examiner*—John W. Huckert
*Assistant Examiner*—William D. Larkins
*Attorney*—Flynn & Frishauf

[57] ABSTRACT

A semiconductor device includes a single crystal substrate comprising a flat surface which has a [311] crystal plane with a tolerance of ±2° with respect to said [311] lattice plane. An insulating film is formed on the flat top surface of the substrate.

6 Claims, 12 Drawing Figures

OXIDE COATED SEMICONDUCTOR DEVICE HAVING [311] PLANAR FACE

The present invention relates to a semiconductor device and more particularly to a semiconductor device using a semiconductor substrate whose outer top surface consists of a [311] crystal plane.

A semiconductor device, for example, a planar transistor, MOS-diode, MOS-type field effect transistor, or integrated circuit involving a large number of such elements is employed in a wide variety of electrical apparatuses so as to realize their miniaturization and high efficiency. The aforementioned semiconductor device uses a semiconductor substrate, the outer top surface of which consists of a lattice plane of [111], [100], [110] or [112]. Further, said semiconductor device is fabricated by forming layers on the lattice plane by means of a vapor phase or epitaxial growth method, diffusion method or alloying method and also by subjecting the substrate to various types of processing, for example, photographic etching, or chemical etching. In this case it is demanded that where the vapor phase growth method is used, layers be formed on the substrate as quickly as possible and that where etching is applied to the surface of the substrate, this operation be carried out also rapidly.

With a semiconductor device such as a planar transistor, MOS-type field effect transistor or MOS-diode wherein there is formed a silicon oxide film on the substrate surface, there also occurs a problem from the effect which the charge density Ns at the surface states defined in the interface between the aforementioned film and substrate exerts on the properties of a semiconductor device, for example, the capacitance-voltage properties in case of a diode, or the threshold voltage properties in case of a transistor. It is known that the aforesaid charge density Ns has an appreciable effect on these properties and that the charge density Ns varies with the selected lattice plane of the substrate surface closely attached to the silicon oxide film, namely, progressively increases in the order of [100]<[110]<[211]<[111]. (Jap. J. Appl. Phys. 4 958 (1965).). Accordingly, with a semiconductor device having the substrate surface coated with a silicon oxide film, it has been customary practice to select a lattice plane of [100] or [110] for the surface of the semiconductor substrate coated with said film. However, a lattice plane such as [110] or [100] had the drawback that the vapor phase growth of layers thereon and the etching operation were unavoidably slowed down, so that such lattice plane was not considered of sufficient practical use.

The present invention has been accomplished in view of the fact that the selection of the lattice plane of a semiconductor substrate has a great bearing not only on the performance of a semiconductor device itself, but also on the velocity of vapor phase growth of layers and the etching operation involved in the manufacture of said device.

An object of the present invention is to provide a semiconductor device which permits, for example, a diode and transistor to display good capacitance-voltage properties and threshold voltage properties respectively.

Another object is to provide a semiconductor device which enables vapor phase growth of layers and the etching operation to be carried out at an accelerated rate during manufacture and consequently can be easily fabricated.

In an aspect of the invention, there is provided a semiconductor device having a semiconductor substrate formed of a single crystal wherein the flat top surface of the substrate consists of a [311] crystal plane or one inclining to an extent of ±5° with respect to said [311] crystal plane.

The present invention can be more fully understood from the following detailed description when taken in connection with the accompanying drawings, in which.

According to the present invention, one surface of a semiconductor substrate used in a semiconductor device is so designed as to have a substantially [311] lattice plane. On that plane there is formed a desired layer by means of vapor growth. Etching may be applied before or after the layer formation. A silicon oxide film is coated thereon.

The semiconductor substrate may consist of a single crystal semiconductor formed of a single element such as silicon or germanium, or compounds of Groups III and V.

By the term "a substantially [311] lattice plane" is meant a [311] lattice plane as well as a plane inclining to an extent of ±5° with respect to said [311] lattice plane.

There will now be compared the semiconductor device of the present invention with that of the prior art by reference to experiments. First, there was prepared five kinds of silicon single crystals having a specific resistivity of 5 to 10 Ωcm. and provided with lattice planes substantially of [111], [110], [100], [211] and [311] respectively. The wafer was polished to a spherical form, so processed as to cause all these lattice planes to appear on the surface and thereafter placed in a reaction furnace consisting of a quartz tube. While rotating the spherical wafer, the temperature of the reaction furnace was raised to 1,200° C. and there was introduced a gas mixture of $SiCl_4$ and $H_2$ to form a layer on the surface of the wafer by means of vapor phase growth. As a result, a layer of uniform thickness was not formed on the wafer surface, preventing the wafer from assuming a perfect spherical shape when the surface of the vapor phase growth layer was observed by the known X-ray diffraction method. It was found that the portion of said surface where said layer grew thickest, namely, the portion where said vapor phase growth was quickest was confined to the [311] lattice plane. The X-ray diffraction method also showed that when the spherical silicon wafer, on the surface of which was formed a layer by vapor phase growth, was etched while being rotated in an etching solution of $5HNO_3+HF$, the aforesaid [311] lattice plane was etched quickest.

After cleaning a germanium substrate whose surface consisted of a [111] lattice plane, the substrate was maintained at a temperature of 600° C. in an ultrahigh vacuum $10^{-9}$ mm. Hg and silicon was vapor deposited at the rate of $2\times10^{14}$ atom/cm.$^2$ to form a silicon epitaxial layer on the surface of the germanium substrate. At this time, the vapor phase grown layer assumed a truncated tetrahedron. When the degree of said growth was analyzed by the diffraction of slow electron beams, it was confirmed that the top surface of said layer presented a [111] lattice plane and the inclined surfaces thereof consisted of a [311] lattice plane. The appearance of the [311] lattice plane on the inclined surfaces indicates that said lattice plane grew quickly in the vapor phase.

Figure 1:
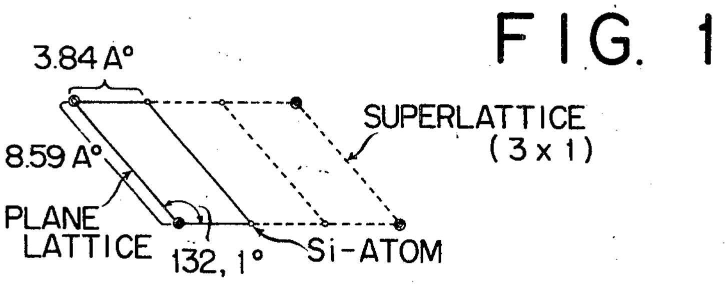
FIG. 1 is a schematic representation of the direct lattice of the [311] of a silicon substrate according to the present invention.

There were prepared three silicon wafers each having a flat surface consisting of lattice planes of [111], [100] and [311] respectively. After chemical etching with the known etching solution, the wafers were placed in an apparatus evacuated to an ultrahigh extent. After bombardment by argon ions, the wafers were annealed at a temperature of 700° C. With the surface thus cleaned, the lattice plane [311] presented a super lattice pattern of 3×1, the lattice plane [111] 7×7 and the lattice plane [100] 2×2 (or 4×4), definitely showing that the surface of each wafer had been fully cleaned. (FIG. 1 is a schematic representation of a [311 lattice plane on the cleaned surface of a silicon wafer as observed by the diffraction of slow electron beams of 32 ev.). On the cleaned surface of each silicon wafer a layer of silicon was grown in the vapor phase using the known method. When the silicon wafer was heated beyond 500° C., its surface displayed the epitaxial formation of a layer having a parallel crystal orientation. That is to say, a [311] oriented epitaxial layer was formed in parallel on [311] surfaces. It was also found at this time that the growth velocity progressively decreased as [311]>[100]>[111].

When measurement was made at a minimum temperature to allow the epitaxial growth of a layer on the surface of each silicon wafer having the respective lattice planes as described above, it was found that the wafer with a [311] lattice plane required 260° to 290° C., the wafer with a [100] lattice plane 290° to 320° C. and the wafer with a [111] lattice plane 360° to 400° C. Thus, the wafer with the [311] lattice plane allowed a layer to grow in the vapor phase at the lowest temperature. The wafers having the aforementioned lattice planes, on which was epitaxially formed a layer, were placed in a vessel evacuated to an extent of $10^{-9}$ mm. Hg and heated 10 hours at a temperature of 800° to 1,200° C. While the wafer with a [311] lattice plane presented no change on the surface condition, the wafer with a [100] lattice plane displayed a helical dislocation and thermal etch pits consisting of a [100] lattice plane, and the wafer with a [111] lattice plane indicated thermal etch pits consisting of [311] and [111] lattice planes.

As mentioned above, it has now been disclosed that the [311] lattice plane of a silicon wafer permitted the epitaxial growth of a layer and etching operation to be realized at a greater velocity than the other crystal planes, and also prevented the occurrence of thermal etch pits. Accordingly, if the semiconductor substrate of a semiconductor device is so processed as to have this [311] lattice plane, it will allow said device to be manufactured with ease and the quality of an electrical apparatus using said device to be elevated.

There will now be described by reference to FIG. 2 an MOS-type diode as a concrete example of the semiconductor device of the present invention in comparison with that of the prior art.

There were prepared N-type silicon wafers 10 having a specific resistivity of 5 to 8 Ωcm., one exposed flat surface of each consisting of a lattice plane substantially of [311], [111], [110], [100] or [211]. The flat surface of each silicon wafer was mirror finished by an appropriate known method. The wafer surface was etched using a mixed solution of $HNO_3$ and HF. The wafers were heated 5 minutes in an atmosphere of wet oxygen which had been obtained by allowing oxygen gas to pass through water at 80° C. and then heated to 1,200° C. Thus on the mirror finished surface of each silicon wafer was formed a silicon oxide film 11 of about 2,000 A units (a high-temperature oxidation process as so called). The formation of such a silicon oxide film may also be made by what is named the low-temperature oxide film preparing process, which consists in placing the silicon wafer in a heating furnace at 605° to 705° C, introducing into the furnace an argon gas which has been allowed to pass through a solution of ethyl orthosilicate, thermally decomposing the ethyl orthosilicate present in the argon gas and forming a silicon oxide film of about 3,000 A units on the mirror finished surface. Thereafter on the silicon oxide film thus formed on the surface of each silicon wafer, as well as on the substrate, was vapor deposited an aluminum layer to form gate electrodes 12 and 13 each having an area of $1\times10^{-3}$ cm.$^2$. The mass was heated 10 to 15 minutes at a temperature of 500° C. to form an Al-$SiO_2$-Si MOS-type diode.

Figure 4:
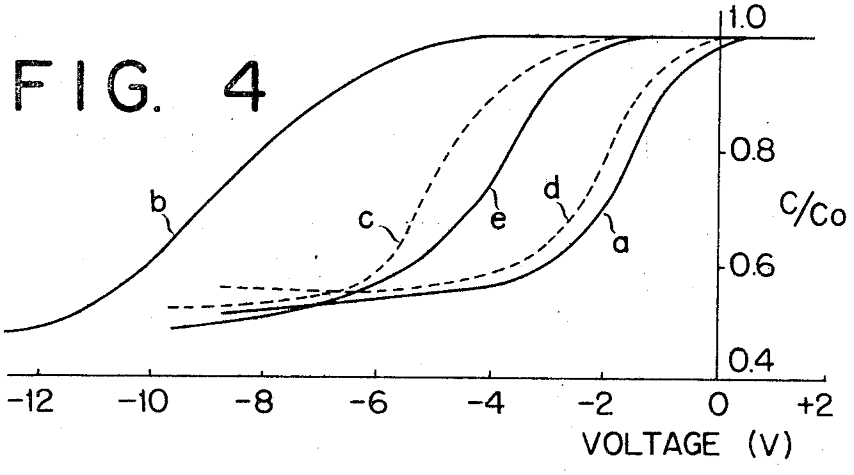

There were prepared 10 MOS-diodes corresponding to each of the aforesaid exposed lattice planes of the silicon wafers. The result of determination which was made by the known method, concerning the relationship between the AC capacitance C (1MH$_z$.) and the DC applied voltage V of each group of 10 MOS-type diodes are indicated by the curves of FIGS. 3 and 4. (Each curve represents the average value of each group of 10 MOS-type diodes corresponding to the aforementioned respective lattice planes.) FIG. 3 is associated with the diodes prepared by the high-temperature oxidation process and FIG. 4 with those formed by the low-temperature process. The curves *a*, *b*, *c*, *d* and *e* respectively denote the properties of the diodes using the semiconductor devices whose exposed surfaces consisted of lattice planes of [311], [111], [110], [100] and [211] respectively.

Figures 2, 3:
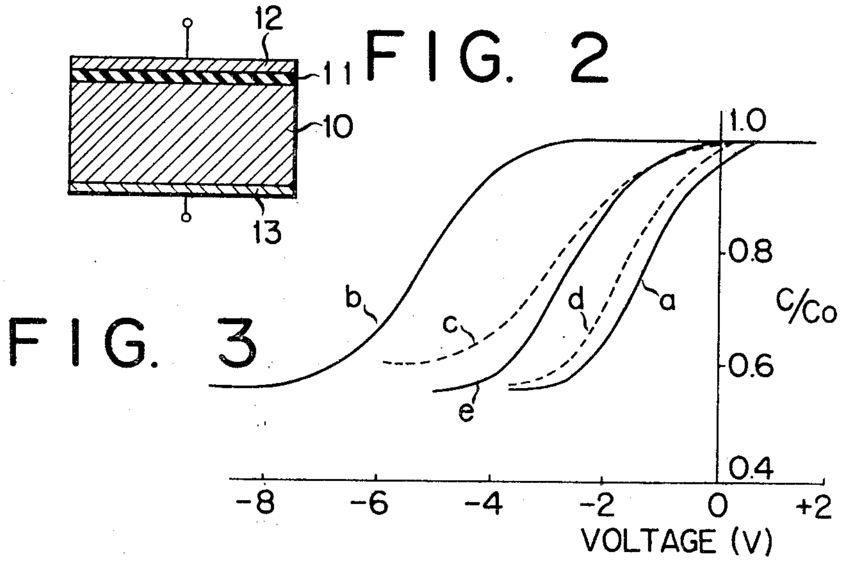
FIG. 2 is a sectional view showing the arrangement of an MOS-type diode according to the invention.
FIGS. 3 and 4 are curve diagrams comparing the capacitance-voltage properties of an MOS-type diode according to the present invention with those of the prior art similar diode.

As clearly seen from FIGS. 3 and 4, on semiconductor substrates having the same crystal plane, the different processes of forming a silicon oxide film resulted in the varying absolute values of the flat band bias $V_{FB}$ as so named (in this example the impressed voltage was of the order of $C/C\approx0.8$, where *Co* is the AC capacitance of the silicon oxide film). In either process of forming the silicon oxide film, however, a semiconductor device prepared according to the present invention from a semiconductor substrate having a [311] lattice plane presented a minimum value of the flat band bias, the magnitude of the flat band bias progressively decreasing in the order of [111]>[110]>[211]>[100]>[311]. A group of 10 semiconductor devices formed of semiconductor substrates having a [311] lattice plane had an average value of the flat bias $V_{FB}$ 15 percent smaller than those with a [100] lattice plane. This means that in the case of the [311] lattice plane, the charge density Ns at the surface states defined in the interface between the silicon oxide film and silicon substrate is small and that a diode prepared from a semiconductor device involving said [311] lattice plane can have excellent surface stability.

Figure 5A:
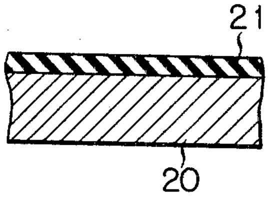
FIGS. 5A to 5G are sectional views of the sequential steps of manufacturing an MOS-type field effect transistor according to the invention.
Figure 5B:
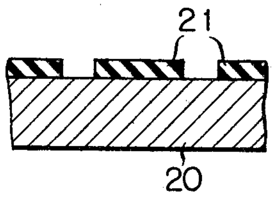
Figure 5C:
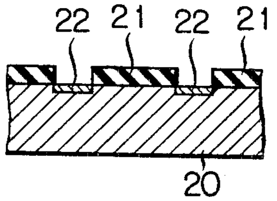
Figure 5D:
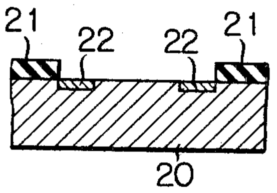
Figure 5E:
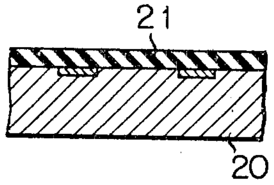
Figure 5F:
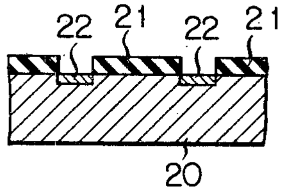
Figure 5G:
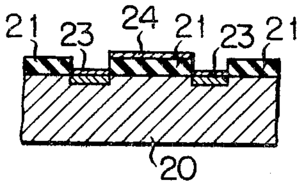

There will now be described by reference to FIGS. 5A to 5G the method of manufacturing a P-type channel MOS-FET (field effect transistor), as well as the comparison of the properties of transistors prepared thereby. There were prepared N-type silicon wafers having a specific resistivity of 2 to 10 Ωcm. whose exposed surfaces consisted of lattice planes of [311], [111], [110] and [100] respectively. On the exposed processed surface of the silicon wafer 20 was deposited a silicon oxide film 21 having a thickness of 5,000 to 6,000 A units as shown in FIG. 5A. The formation of the silicon oxide film was carried out by treating the silicon wafer in an atmosphere of wet oxygen which had been obtained by allowing oxygen gas to pass through water at 80° C. and then heated to 960° to 1,000° C. Then as shown in FIG. 5B, the prescribed portions of the silicon oxide film 21 were removed by photographic etching to expose the upper processed surface of the silicon wafer 20 in the form of two narrow bands. After heating to 1,050° C., boron bromide was diffused in the wafer from the band-shaped exposed portions to form a diffused layer 22 as shown in FIG. 5C to such extent that the boron was introduced to a depth of about 2 microns. The silicon oxide film remaining between the two band-shaped exposed portions was removed using an aqueous solution of HF as shown in FIG. 5D, thereafter the silicon wafer was heated 7 minutes at 1,145° C. in an atmosphere of wet oxygen and then 10 to 15 minutes at 1,145° C. in an atmosphere of dry oxygen to form again as shown in FIG. 5E a silicon oxide film all over the processed surface of the wafer (at this time there was deposited a silicon oxide film having a thickness of about 2,000 A units at that portion of the wafer surface from which the previously formed silicon oxide film had been removed). Again those portions of the silicon oxide film which lay on the diffused layers 22 were removed as shown in FIG. 5F. At this stage the boron was again diffused to a depth of about 2.5 microns by means of heating and oxidation, the surface resistivity of these diffused portions being about 20 Ωcm. Thereafter substantially all the surface of the silicon wafer was coated with a layer of aluminum by vapor deposition. The aluminum layer, except for the portions on the diffused layers and the silicon oxide film disposed between the diffused layers, was removed by photographic etching so as to form electrodes 23 and 24 as shown in FIG. 5G. The silicon wafer was heated 10 to 20 minutes at 500° C. From the vapor deposited aluminum layers 23 and 24 were drawn out aluminum wires constituting electrodes for the source, gate and drain layers respectively. Thus was formed an MOS-type field effect transistor. The gate electrode of the MOS-type field effect transistor was impressed with a negative potential to the extent that the curve representing the capacitance-voltage properties thereof was brought down to the lowest point, thereby to form a P-type channel in the substrate under the bottom surface of the gate electrode. Thereafter the transistor was impressed with a voltage so as to cause the drain electrode to assume a negative polarity with respect to the source electrode and there was introduced a hole current across the source and drain layers. From the current-voltage properties displayed by the transistor this time can be determined the hole mobility $\mu s$ (cm.$^2$/v.·sec.) in the P-type channel layer formed on the surface. It is known that a transistor is generally preferred to have a large value of said hole mobility $\mu s$, which results in high transconductance. When determination was made of the hole mobility $\mu s$ (cm.$^2$/v.·sec.) of the respective transistors prepared from silicon wafers whose exposed processed planes consisted of different lattice planes, there were obtained the following results.

The MOS-FET according to the present invention, namely, a transistor formed of a silicon wafer whose exposed processed plane consisted of a [311] lattice plane displayed a hole mobility of 290±30, under sufficiently large negative potential to the gate. As against this, the transistors prepared from silicon wafers whose exposed processed surfaces consisted of lattice planes of [100], [110] and [111] indicated a hole mobility of 260±30, 150±35 and 90±20 respectively, proving that the transistor of the present invention exhibited the greatest hole mobility.

As is apparent from the aforementioned example, the semiconductor device of the present invention using a single crystal semiconductor substrate whose exposed processed surface substantially consists of a [311] lattice plane enables an epitaxial growth of layers by vapor phase reaction or deposition to be effected with greater ease and the etching operation to be performed at a greater velocity than is possible with the prior art, thus making it easy to manufacture the present semiconductor device. Moreover, the semiconductor device of the present invention has thermal stability, and, where there is used a silicon oxide film, the charge density at the surface states defined in the interface between said film and the semiconductor substrate is reduced and the hole mobility is elevated. Therefore, for example, in an MOS-type effect transistor, the threshold voltage and the noise are reduced, and the mutual conductance is increased.

The semiconductor device of the present invention is applicable not only in an MOS-type diode and planar transistor but also in many other kinds of transistors and diodes.

Figure 6:
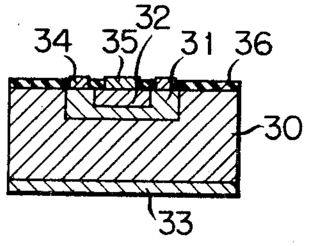
FIG. 6 is a sectional view of a planar transistor according to the invention.

There will now be described by reference to FIG. 6 the case where the semiconductor device of the present invention is used in a planar transistor.

Numeral 30 of the figure denotes a P-type silicon substrate which forms a collector layer. The exposed upper surface of the substrate consists of a [311] lattice plane. On the top surface of the substrate 30 are formed by the known diffusion method a base layer 31 and emitter layer whose upper surfaces are exposed. On the bottom side of the substrate 30 is vapor deposited a collector electrode 33 and on the top side of the substrate 30 a base electrode 34 and emitter electrode 35. The top surface of the substrate 30, except for the aforesaid electrodes, is coated with a silicon oxide film 36. The planar transistor of the aforementioned arrangement can be easily manufactured and enables the charge density Ns at the surface states defined in the interface between the silicon oxide film and silicon substrate to be reduced and as a result the leakage current and noise to be reduced and the inverse breakdown voltage to increase.

What is claimed:

1. A semiconductor device comprising:

a semiconductor substrate having a flat top surface, said substrate being formed of a single crystal and said flat top surface having a [311] crystal plane having a tolerance of ±2°; and an insulating film disposed over said flat top surface.

2. A semiconductor device according to claim 1 wherein said insulating film covers a portion of said flat top surface, said film being comprised of an oxide of silicon, and further comprising electrodes on said film and on the remaining uncoated portion of said flat top surface.

3. A semiconductor device according to claim 1 wherein the substrate is formed of silicon.

4. A semiconductor device according to claim 3 comprising:

a planar type transistor formed within said substrate and having collector, base and emitter regions formed within said flat top surface of said substrate, first and second PN-junctions being formed between the respective collector and base regions and the base and emitter regions, said PN-junctions extending to said flat top surface;

said insulating film covering at least said PN-junctions at said flat top surface; and emitter, base and collector electrodes attached to said emitter, base and collector regions, respectively.

5. A semiconductor device according to claim 3 comprising:

a field effect transistor formed within said substrate, said field effect transistor having a respective source and drain region extending from said flat top surface into said substrate, said insulating film comprising a silicon oxide film formed on said flat top surface at least between said source and drain regions; and electrodes connected to said source and drain regions and to that part of said oxide film between said regions.

6. A semiconductor device according to claim 6 further comprising at least one active region of opposite conductivity type to that of said substrate formed within said substrate and extending from said flat top surface.

* * * * *

UNITED STATES PATENT OFFICE
CERTIFICATE OF CORRECTION

Patent No. 3,636,421 Dated January 18, 1972

Inventor(s) Yoshiyuki Takeishi et al.

It is certified that error appears in the above-identified patent and that said Letters Patent are hereby corrected as shown below:

Claim 6, line 1, "according to claim 6" should read -- according to claim 1 --.

Signed and sealed this 6th day of June 1972.

(SEAL)
Attest:

EDWARD M.FLETCHER,JR.
Attesting Officer

ROBERT GOTTSCHALK
Commissioner of Patents